(12) United States Patent
Frederick et al.

(10) Patent No.: US 9,117,187 B2
(45) Date of Patent: Aug. 25, 2015

(54) PRESENTING A FILTERED LIST OF WORK ITEMS

(71) Applicant: International Business Machines Corporation, Armonk, NY (US)

(72) Inventors: Kimberly A. Frederick, Ayer, MA (US); Brian C. Schimpf, Harvard, MA (US); Phyllis A. Smith, Newton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 13/795,942

(22) Filed: Mar. 12, 2013

(65) Prior Publication Data

US 2014/0278632 A1    Sep. 18, 2014

(51) Int. Cl.
*G06Q 10/06*    (2012.01)

(52) U.S. Cl.
CPC .............................. *G06Q 10/063112* (2013.01)

(58) Field of Classification Search
USPC .......................... 715/764, 781, 863, 961, 963; 705/7.13–7.26, 7.42, 320–321; 707/E17.059, E17.108, 748, 752, 754, 707/755, 758, 999.1, 999.102, 999.01
See application file for complete search history.

(56) References Cited

U.S. PATENT DOCUMENTS

| | | | |
|---|---|---|---|
| 8,548,838 B1 * | 10/2013 | Ganesan | 705/7.13 |
| 2002/0087382 A1 * | 7/2002 | Tiburcio | 705/9 |
| 2006/0047558 A1 * | 3/2006 | Uchiyama et al. | 705/9 |
| 2007/0299953 A1 * | 12/2007 | Walker et al. | 709/223 |
| 2009/0204470 A1 * | 8/2009 | Weyl et al. | 705/9 |
| 2009/0276281 A1 | 11/2009 | Foltz et al. | |
| 2010/0174578 A1 * | 7/2010 | Duffy et al. | 705/9 |
| 2011/0276369 A1 | 11/2011 | Bean et al. | |
| 2012/0053977 A1 | 3/2012 | Bagheri et al. | |
| 2012/0239451 A1 * | 9/2012 | Caligor | 705/7.21 |

FOREIGN PATENT DOCUMENTS

WO    9953390 A2    10/1999

OTHER PUBLICATIONS

"KanBan Definition" [online] Business Dictionary [retrieved Jan. 14, 2013] retrieved from the Internet: <http://www.businessdictionary.com/definition/kanban.html>, 1 pg.

"KanBan" [online] Wikipedia, the Free Encyclopedia [retrieved Feb. 27, 2013] retrieved from the Internet: <http://en.wikipedia.org/wiki/Kanban>, 6 pgs.

(Continued)

*Primary Examiner* — Doon Chow
*Assistant Examiner* — Wendy Nicholas
(74) *Attorney, Agent, or Firm* — Cuenot, Forsythe & Kim, LLC (57) ABSTRACT

For each of a plurality of the work items, at least a first parameter to be associated with the work item can be received and associated with the work item. Each of the plurality of work items can be compiled in a work item list. In response to receiving a request to present the work item list to the user, the work item list can be filtered, via a processor, based on the first parameter and at least a second parameter associated with the user that corresponds to the first parameter. The filtered work item list can be presented to the user.

15 Claims, 3 Drawing Sheets

(56) References Cited

OTHER PUBLICATIONS

"Scrum (development)" [online] Wikipedia, the Free Encyclopedia [retrieved Jan. 14, 2013] retrieved from the Internet: <http://en.wikipedia.org/wiki/Scrum_%28development%29>, 4 pgs.

Balduzzi, P. et al. "Voting in Corporate Boards with Heterogeneous Preferences" No. 3332, CESifo Working Paper Series from CESifo Group, Munich, 2011, 36 pgs.

"Scrum Training Agile Training from ScrumMaster Mike Cohn," [online] Mountain Goat Software © 1998-2013, [retrieved Mar. 12, 2013] retrieved from the Internet: <http://www.mountaingoatsoftware.com/>, 6 pgs.

"Scrum.org—The Home of Scrum," [online] Scrum.org © 2013 [retrieved Mar. 12, 2013] retrieved from the Internet: <http://www.scrum.org/>, 4 pgs.

* cited by examiner

```
For each of a plurality of the work items, receive at least a first parameter
to be associated with the work item and
associate the first parameter with the work item
202
```

↓

```
Compile each of the plurality of work items in a work item list
204
```

↓

```
Receive a request to present the work item list to the user
206
```

↓

```
Filter, via a processor, the work item list based on the first parameter and
at least a second parameter associated with the user that corresponds to
the first parameter, wherein the second parameter pertains to a level of
skill of the user
208
```

↓

```
Present the filtered work item list to the user, wherein the filtered work
item list indicates work items for which the user has a requisite level of
skill
210
```

↓

```
Receive a user input selecting a work item to be assigned to the user
212
```

PRESENTING A FILTERED LIST OF WORK ITEMS

BACKGROUND

One or more arrangements described herein relate to computer information systems and, more particularly, to agile software development.

Agile software development is a group of software development methods. These methods are based on iterative and incremental development, where requirements and solutions evolve through collaboration between self-organizing, cross-functional teams. Agile software development promotes adaptive planning, evolutionary development and delivery, and encourages rapid and flexible response to change. In this regard, it is a conceptual framework that promotes interactions throughout the development cycle.

Scrum is an example of a software development framework that leverages agile software development to manage software projects, such as product or application development. Scrum implements methods of empirical process control for project management in situations where it is difficult to plan ahead. Scrum's approach to planning and managing projects is to bring decision-making authority to the level of operation properties and certainties. In lieu of traditional command-and-control management, Scrum uses feedback loops that constitute a core management technique.

Scrum is based on a team model, including personnel both for core roles and ancillary roles. The core roles typically include a product owner, a development team and a scrum master. The product owner represents the stakeholders and presents their input to the team. The development team is responsible for delivering potentially shippable product increments at the end of each sprint. The scrum master is accountable for removing impediments to the ability of the team to deliver the sprint goal/deliverables. A test and evaluation team also can be a core role if the development team does not perform test and evaluation. The ancillary roles typically include the stakeholders (e.g., customers, venders, etc.) and managers who control the work environment.

A "sprint" is the basic unit of development in Scrum. A sprint is a timeboxed effort. In other words, it is restricted to a specific duration. The duration usually is fixed in advance for each sprint. During each sprint, a team creates finished portions of a product. The set of features that go into a sprint are specified by a product backlog, which is an ordered list of requirements.

BRIEF SUMMARY

One or more arrangements described herein relate to computer information systems and, more particularly, to presenting lists of work items to users.

An embodiment can include a method of presenting a list of work items to a user. The method can include, for each of a plurality of the work items, receiving at least a first parameter to be associated with the work item and associating the first parameter with the work item. Each of the plurality of work items can be compiled in a work item list. In response to receiving a request to present the work item list to the user, the work item list can be filtered, via a processor, based on the first parameter and at least a second parameter associated with the user that corresponds to the first parameter, wherein the second parameter pertains to a level of skill of the user. The filtered work item list can be presented to the user, wherein the filtered work item list indicates work items for which the user has a requisite level of skill. A user input selecting a work item to be assigned to the user can be received.

Another embodiment can include a system having a processor. The processor can be configured to initiate executable operations including, for each of a plurality of the work items, receiving at least a first parameter to be associated with the work item and associating the first parameter with the work item. Each of the plurality of work items can be compiled in a work item list. In response to receiving a request to present the work item list to the user, the work item list can be filtered based on the first parameter and at least a second parameter associated with the user that corresponds to the first parameter, wherein the second parameter pertains to a level of skill of the user. The filtered work item list can be presented to the user, wherein the filtered work item list indicates work items for which the user has a requisite level of skill. A user input selecting a work item to be assigned to the user can be received.

Another embodiment can include a computer program product for presenting a list of work items to a user. The computer program product can include a computer-readable storage medium having stored thereon program code that, when executed, configures a processor to perform a method. The method can include, for each of a plurality of the work items, receiving, by the processor, at least a first parameter to be associated with the work item and associating, by the processor, the first parameter with the work item. Each of the plurality of work items can be compiled, by the processor, in a work item list. In response to receiving a request to present the work item list to the user, the work item list can be filtered, by the processor, based on the first parameter and at least a second parameter associated with the user that corresponds to the first parameter, wherein the second parameter pertains to a level of skill of the user. The filtered work item list can be presented, by the processor, to the user, wherein the filtered work item list indicates work items for which the user has a requisite level of skill. A user input selecting a work item to be assigned to the user can be received by the processor.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to computer information systems and, more particularly, to presenting lists of work items to users. Each individual user can have a dynamic filter set up for his view of a backlog of work items. A product owner or other leader can categorize each work item using one or more parameters, such as area of the product to which the work item pertains, type of work required, complexity of the required work, and/or any other parameters that indicate which members of a team may be best suited for performing tasks related to the work item, such as native language knowledge for translation verification test. Certain parameters can be Boolean (e.g., yes or no) and others comprise a range of values.

A user's filter can be configured to have matching settings for the manner in which the work items are categorized, and used to filter the work items based on the parameters assigned to the work items and corresponding parameters associated with the user. The filtered work items can be presented to the user in a work item list. For example, a user can specify, as a user parameter, a range of complexity she feels comfortable addressing. The user's filter can filter the work items having an assigned parameter that satisfies the user parameter, and such work items can be presented to the user in a list. The work items can be ranked in the list, for example, based on the complexity of the work items.

Based on the work item list, the user is able to self-assign high-value, appropriate work items without waiting for a scrum meeting or a scrum master to assign the work items. In one arrangement, the user is able to undertake a task for which he or she may not have strong experience, for example as a learning exercise for the user, but only if the task is deemed low risk and if the current project phase allows for such tasks to be done in the current iteration.

Figure 1:
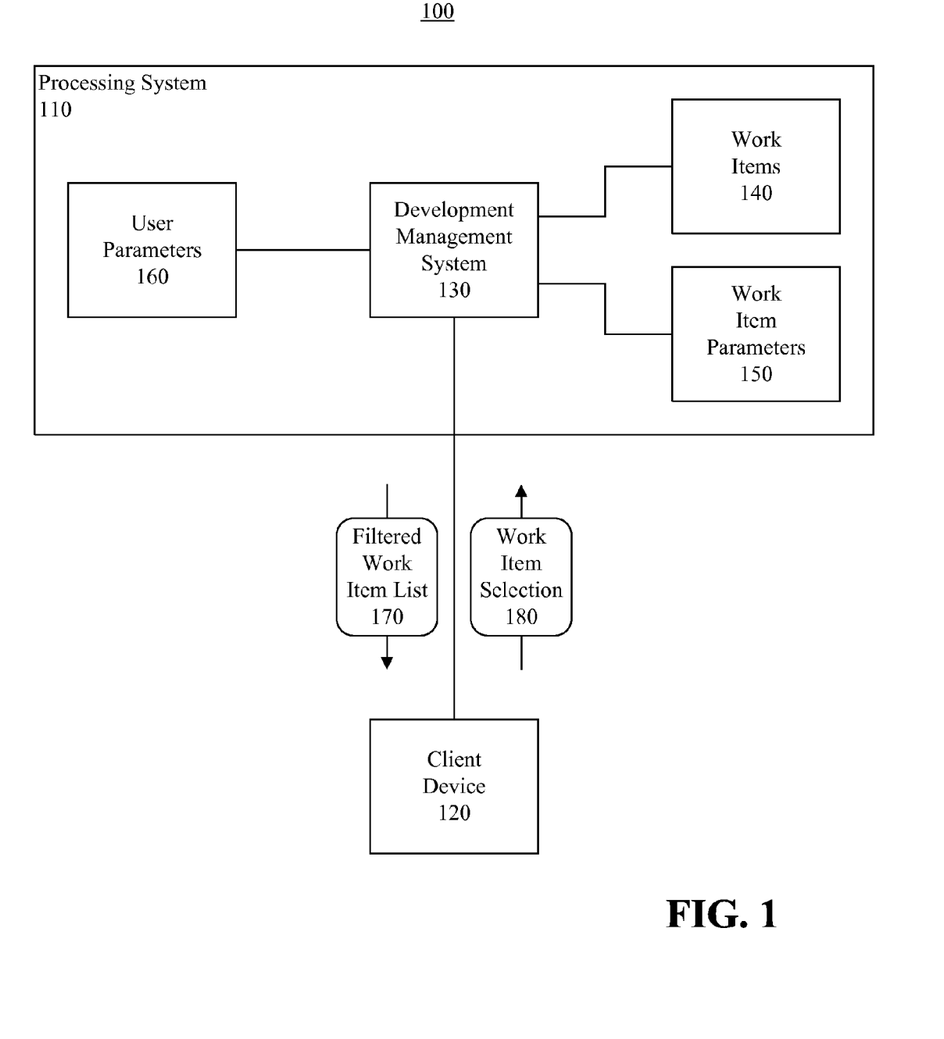
FIG. 1 is a block diagram illustrating a system for presenting a list of work items to a user in accordance with one embodiment disclosed within this specification.

FIG. 1 is a block diagram illustrating a system 100 for presenting a list of work items to a user in accordance with one embodiment disclosed within this specification. The system 100 can include a processing system 110, such as a server, communicatively linked to one or more client devices, such as a client device 120, via one or more suitable communication networks. The client device 120 can be a computer (e.g., a workstation, a desktop computer, a laptop computer, a notebook computer, a tablet computer, etc.), a personal digital assistant, a smartphone, or any other processing system including a processor and memory via which a user may interact with the development management system 130 as described herein. The communication network(s) can be implemented as, or include, any of a variety of different public and/or private networks such as a WAN, a LAN, a wireless network, a mobile network, a Virtual Private Network (VPN), the Internet, the Public Switched Telephone Network (PSTN), or the like.

The processing system 110 can host a development management system 130, which can be implemented as an application or other suitable software. The development management system 130 can include, or be communicatively linked to, one or more databases or other suitable data structures (hereinafter collectively referred to as "database").

The database can store a plurality of work items 140, work item parameters 150 and user parameters 160. The work items 140 can indicate tasks that are to be performed by one or more users, for example for software development. Examples of such tasks include, but are not limited to, generating computer program code, updating computer program code, performing maintenance on computer program code, or performing any other tasks that may be required to develop software. In one non-limiting arrangement, the work items 140 can be associated with, or assigned to, sprints in a Scrum software development framework.

Each work item parameter 150 can be associated with a respective work item 140, and each work item 140 can be associated with one or more work item parameters 150. Each work item parameter 150 can specify a level of importance of the work item 140, an area of a product to which the associated work item 140 pertains, the type of work required for the work item 140, the complexity of the required work for the work item 140, knowledge of one or more programming languages and/or software tools required for the work item 140, spoken/written language knowledge required for the work item 140, a risk associated with the work item 140, time constraints associated with the work item 140, or any other parameter that indicates which members of a team may be best suited for performing tasks related to the work item 140. A work item parameter 150 also can indicate whether a work item 140 presently is assigned to a user and, if so, a work item parameter 150 can indicate to whom the work item 140 is assigned. In this regard, the work item parameters 150 can be specified using numeric values, alphanumeric text and/or the like. By way of example, the complexity of the required work can be specified using a numeric value, while the nature of the work can be specified using alphanumeric text. The work item parameter(s) 150 assigned to each work item 140 can be specified by one or more users, such as a scrum master and/or one or more members of a team having knowledge of the nature of the work item 140.

The user parameters 160 can include parameters associated with (e.g., assigned to) each of a plurality of users, for example the user of the client device 120. In one arrangement, a user profile can be associated with each user, and the user parameters 160 can be stored in the user profiles. In illustration, the user parameters 160 associated with a particular user can be stored in a user profile associated with that user. Each user parameter 160 can indicate the skill level of a respective user, an area of work in which the user specializes or has the requisite knowledge, skill and/or ability to work, a range of work complexities the user is capable of, or comfortable with, handling (e.g., based on years of experience), computer programming languages and/or software tools with which the user is familiar, spoken/written languages in which the user is fluent, and the like. In this regard, the user parameters 160 can be specified using numeric values, alphanumeric text and/or the like. In one arrangement, a user parameter 160 can be associated with the user that indicates an area of work in which the user does not have strong experience, but in which the user desires to gain experience. The user parameters 160 for each respective user can be specified by that user, the user's manager, the scrum master and/or another suitable person. For example, the user can meet with the user's manager and/or scrum master to decide on the user parameters 160 associated with that user and/or to periodically update such user parameters 160.

In operation, the development management system 130 can present a filtered work item list (hereinafter "work item list") 170 to the user of the client device 120. For example, the development management system 130 can communicate the work item list 170 to the client device 120 in response to a request by the user to view the work item list 170, in response to the user completing a work item 140, in response to the user logging into the client device 120, etc. The work item list 170 can include a listing of work items 140 available for the user to select. From the work item list 170, the user can select a work item 140 the user chooses to work on, for example via a user input selecting the work item 140 in the work item list 170. A work item selection 180 corresponding to the user input can be communicated from the client device 120 to the development management system 130. In response, the development management system 130 can assign the selected work item 140 to the user. For example, the development management system 130 can update the work item parameters 150 associated with the work item 140 to indicate that the work item 140 is assigned to a user and the user to whom the work item 140 is assigned.

To generate the work item list 170, the development management system 130 can filter the work items 140 by matching the user parameters 160 of the user to work item parameters 150, and select work items 140 associated with the work item parameters 150 that match the user parameters 160 of the user. In illustration, the development management system 130 can query the user parameters 160 to identify user parameters 160 associated with the user, and query the work item parameters 150 to identify work items 140 for which the work item parameters 150 match the identified user parameters 160. Such identified work items 140 can be included in the work item list 170. In other words, the development management system 130 can filter the work items 140 having work item parameters 150 that match the user parameters 160 of the user. For each work item 140, the work item list 170 can indicate one or more associated work item parameters 150, for example the level of importance, ranking, complexity, area of work, language requirements, etc. The user can select individual work items 140 to retrieve additional information related to the work items 140.

By way of example, assume the user parameters 160 of a particular user indicate that the user has a skill level "35," prefers to work on work items 140 requiring a skill level between "20" and "35," specializes in user interface development, and is fluent in English and Spanish. The development management system 130 can identify work items 140 that require, as indicated in the work item parameters 150, a skill level between "20" and "35," a user who specializes in user interface development, and a user who is fluent in English and/or Spanish. Such work items 140 can be included in the work item list 170 presented to the user.

In one arrangement, a user may have a skill level of "35," but her user parameters 160 can indicate her desire to work on more challenging work items 140 beyond that skill level, and perhaps indicate a skill level or level of complexity for work items 140 she would like to have an opportunity to work in. In such case, work items 140 that are more challenging, but which have a relatively low level of risk (as indicated by the associated work item parameters 150) can be included in the work item list 170. Accordingly, the user can choose such a work item 140 from the list to have that work item 140 assigned to her. Work items 140 that are time sensitive, for example within a certain range of a general availability date, can be considered to have a high level of risk, and need not be presented to the user in the work item list 170 if they are above the users current skill level or comfortable level of complexity. Users also can indicate, in their user parameters 160, their desire to work in other development areas, and can be indicted in the work item list 170 to provide the user an opportunity to work in such areas so long as the level of risk and/or complexity is low. Such work items 140 can be visually distinguished from work items the user presently is qualified to work on as indicted by the user parameters 160 of the user. For example, the work items 140 the user presently is qualified to work on can be presented with one or more visual effects, such as highlighting, bold font, or the like.

In one aspect, to generate the work item list 170, the development management system 130 can filter the work items 140 by matching the user parameters 160 of a plurality of users, for example those users who are part of a software development team, to the work item parameters 150. Moreover, user parameters 160 (e.g., team parameters) can be created for the team, and such user parameters 160 can be matched to the work item parameters 150 to identify work items 140 suitable for the team.

Further, the work item list 170 can indicate, for each work item 140, the users whose user parameters 160 match the work item parameters 150 associated with the work item 140. Moreover, the work item list 170 can indicate users who are presently available to work on the respective work items 140, users to whom work items 140 are presently assigned, importance, ranking, complexity and the like. The work item list 170 also can indicate the user parameters 160 associated with each of the respective users. Accordingly, a scrum master will be able to see the collective vision for his team, not just each individual's possible work items. The scrum master can, however, narrow the work item list 170 to only see work items 140 assigned to particular users.

In one example, when the work item list 170 is presented to a user, one or more messages also can be presented to the user to indicate work items 140 that currently are not assigned to a user, which users, accordingly to their user parameters 160, are qualified to work on the work items 140, which users are overcommitted, which users are not fully utilized (e.g., because of their user parameters 160), and/or the any other information relevant to the software development. Accordingly, the team members, scrub master and/or other users can review the work item list 170 to identify bottlenecks with certain individuals, gaps in skills, etc.

The work items 140 can be ranked in the work item list(s) 170 in any suitable manner. For example, the work items 140 can be presented in the work item lists(s) 170 in an order based on respective levels of importance for the work items 140, the complexity of the work items 140, the skill level required for the work items 140, or the like. In one arrangement, when viewing the work item list 170, the user can enter one or more user inputs to re-order the listing of work items 140 based on one or more of the work item parameters 150. Further, the user can be provided an option to open, or toggle between, a plurality of work item lists 170. For example, an work item list 170 can be generated based on user parameters 160 for a particular user, and a work item list 170 can be generated based on user parameters 160 for a team of users, and the user can view both work item lists 170.

Figure 2:
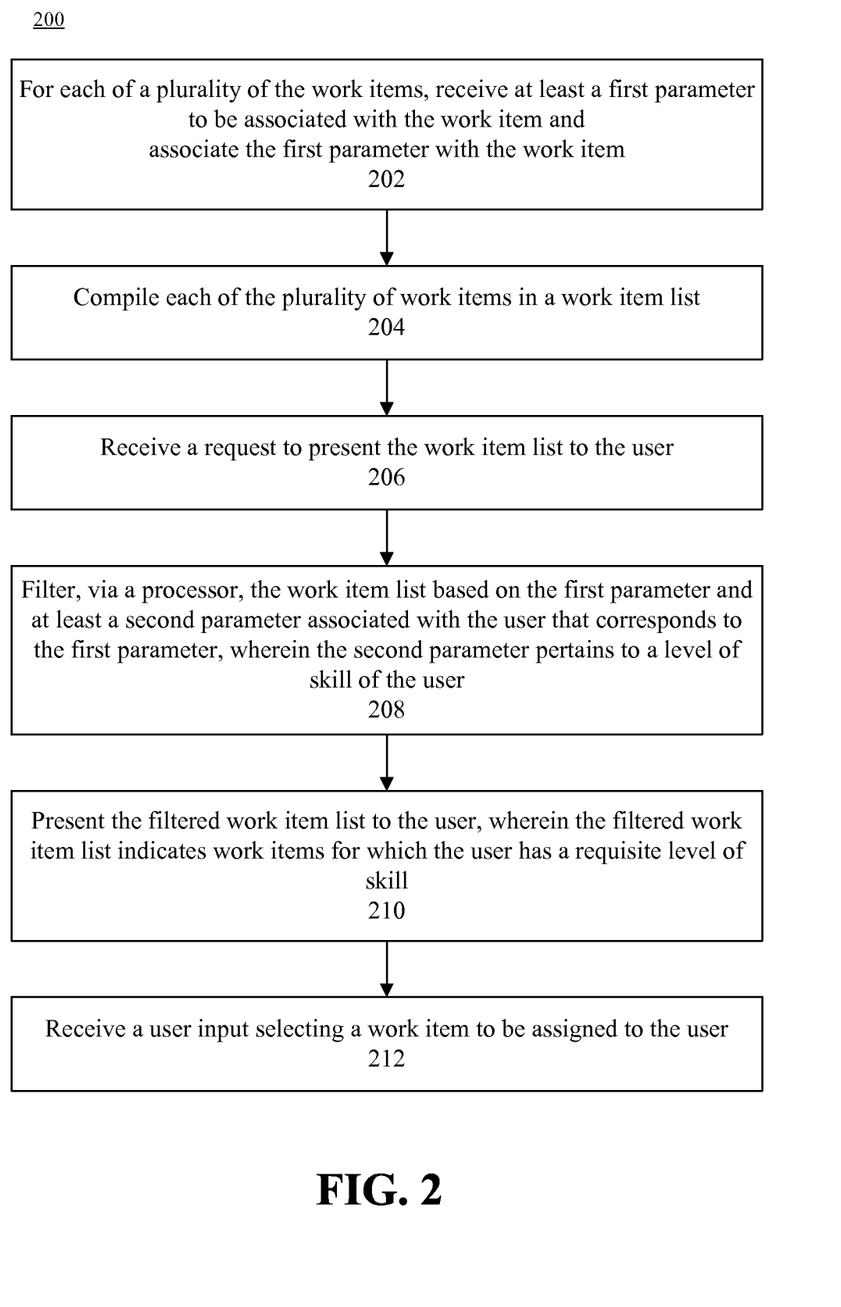
FIG. 2 is a flow chart illustrating a method of presenting a list of work items to a user in accordance with another embodiment disclosed within this specification.

FIG. 2 is a flow chart illustrating a method 200 of presenting a list of work items to a user in accordance with another embodiment disclosed within this specification. At step 202, for each of a plurality of the work items, at least a first parameter to be associated with the work item can be received and the first parameter can be associated with the work item. At step 204, each of the plurality of work items can be compiled in a work item list. At step 206, a request to present the work item list to the user can be received. At step 208, in response to receiving the request, the work item list can be filtered, via a processor, based on the first parameter and at least a second parameter associated with the user that corresponds to the first parameter, wherein the second parameter pertains to a level of skill of the user. At step 210, the filtered work item list can be presented to the user, wherein the filtered work item list indicates work items for which the user has a requisite level of skill. At step 212, a user input electing a work item to be assigned to the user can be received.

Figure 3:
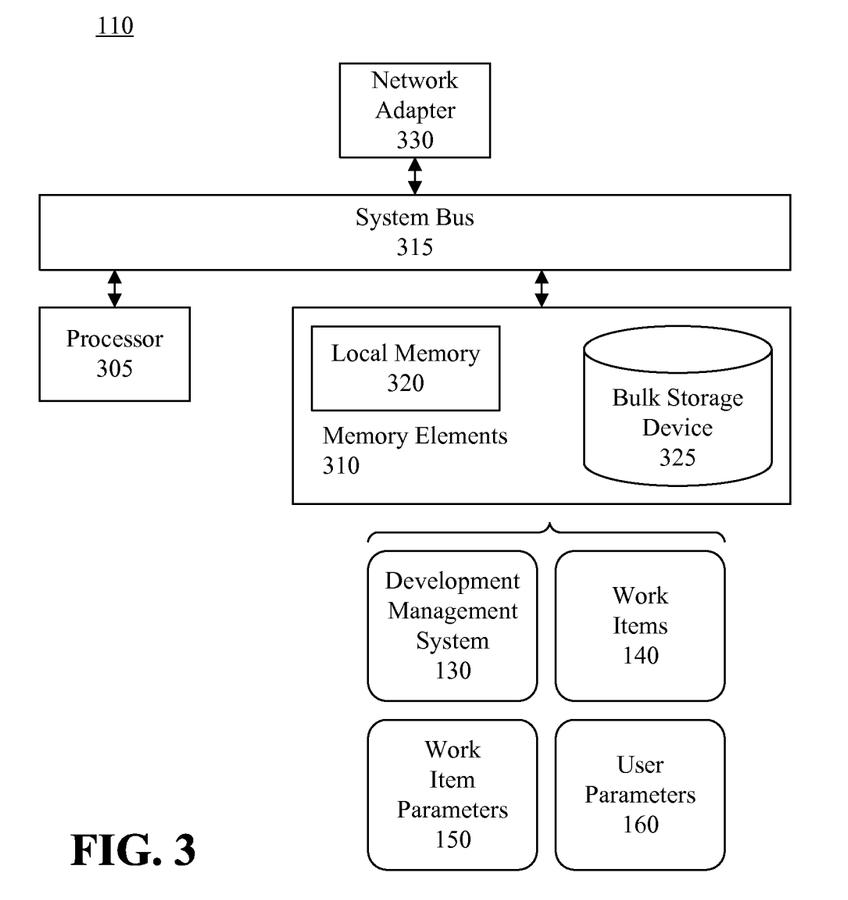
FIG. 3 is a block diagram illustrating a processing system for presenting a list of work items to a user in accordance with one embodiment disclosed within this specification.

FIG. 3 is a block diagram illustrating a processing system 110 for presenting a list of work items to a user in accordance with one embodiment disclosed within this specification. The processing system 110 of FIG. 3 is an example of the processing system 110 of FIG. 1.

The processing system 110 can include at least one processor 305 (e.g., a central processing unit) coupled to memory elements 310 through a system bus 315 or other suitable circuitry. As such, the processing system 110 can store program code within the memory elements 310. The processor 305 can execute the program code accessed from the memory elements 310 via the system bus 315. It should be appreciated that the processing system 110 can be implemented in the form of any system including a processor and memory that is capable of performing the functions and/or operations described within this specification. For example, the processing system 110 can be implemented as a server, workstation or any other suitable processing system.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 110 also can include one or more cache memories (not shown) that provide temporary storage of at least some program code in order to reduce the number of times program code must be retrieved from the bulk storage device 325 during execution.

Input/output (I/O) devices, for example one or more network adapters 330, can be coupled to processing system 110 to enable processing system 110 to become coupled to other systems, computer systems, remote printers, and/or remote storage devices through intervening private or public networks. Modems, cable modems, transceivers, and Ethernet cards are examples of different types of network adapters 330 that can be used with processing system 110. Additional I/O devices, such as a display, a keyboard, a mouse, etc. (not shown) optionally can be coupled to the processing system 110.

As pictured in FIG. 3, the memory elements 310 can store the components of the system 100 of FIG. 1, namely the development management system 130, work items 140, work item parameters 150 and user parameters 160. Being implemented in the form of executable program code, the development management system 130 can be executed by the processing system 110 and, as such, can be considered part of the processing system 110. Moreover, the development management system 130 is functional data structure that imparts functionality when employed as part of the processing system 110 of FIGS. 1 and 3. The work items 140, work item parameters 150 and user parameters 160 also are functional data structures that impart functionality when employed as part of the processing system 110 of FIGS. 1 and 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of presenting a list of work items to a user, comprising:
    for each of a plurality of the work items:
        receiving at least a first parameter to be associated with the work item, the first parameter indicating a level of risk assigned to the work item; and
        associating the first parameter with the work item;
    compiling each of the plurality of work items in a work item list; and
    in response to receiving a request to present the work item list to the user:
        filtering, via a processor, the work item list based on the first parameter and at least a second parameter associated with the user that pertains to a level of skill of the user; and
        presenting the filtered work item list to the user, wherein the filtered work item list indicates work items for which the user has a requisite level of skill, and indicates work items for which the user does not have the requisite skill level but are not assigned to users and are assigned a low level of risk;
    receiving a user input selecting a work item to be assigned to the user;
    responsive to receiving the user input selecting the work item to be assigned to the user, updating a third parameter associated with the work item to indicate the work item is assigned to the user; and
    presenting to a second user at least one message indicating the work items that are not assigned to users, which users are qualified to work on the work items that are not assigned to users, which users are overcommitted and which users are not fully utilized.

2. The method of claim 1, wherein presenting the filtered work item list comprises:
    presenting the work items in the filtered work item list in an order based on respective levels of importance of the work items.

3. The method of claim 1, wherein filtering the work item list further is based on the first parameter and at least a third parameter associated with the user that corresponds to the first parameter, wherein the third parameter pertains to a desire of the user to work on work items beyond the level of skill assigned to the user.

4. The method of claim 3, wherein presenting the filtered work item list to the user comprises visually distinguishing in the filtered work item list the work items for which the level of skill of the user matches the first parameter from the work items beyond the level of skill assigned to the user.

5. The method of claim 1, further comprising:
receiving at least a third parameter associated with the work item; and
associating the third parameter with the work item;
wherein filtering the work item list based on the first parameter and at least a second parameter associated with the user comprises filtering the work item based on the first parameter, the second parameter, the third parameter and at least a fourth parameter associated with the user that corresponds to the third parameter, wherein the third parameter pertains to an area of work in which the user specializes or has the requisite knowledge;
wherein the filtered work item list indicates work items for which the user has the requisite level of skill and pertain to the area of work in which the user specializes or has the requisite knowledge.

6. The method of claim 1, wherein the filtered work item list further indicates work items for which other users have requisite levels of skills.

7. The method of claim 1, wherein the filtered work item list further indicates which users are qualified to work on the work items that are not assigned to users.

8. A system comprising:
a processor programmed to initiate executable operations comprising:
for each of a plurality of the work items:
receiving at least a first parameter to be associated with the work item, the first parameter indicating a level of risk assigned to the work item; and
associating the first parameter with the work item;
compiling each of the plurality of work items in a work item list; and
in response to receiving a request to present the work item list to the user:
filtering the work item list based on the first parameter and at least a second parameter associated with the user that pertains to a level of skill of the user; and
presenting the filtered work item list to the user, wherein the filtered work item list indicates work items for which the user has a requisite level of skill, and indicates work items for which the user does not have the requisite skill level but are not assigned to users and are assigned a low level of risk;
receiving a user input selecting a work item to be assigned to the user;
responsive to receiving the user input selecting the work item to be assigned to the user, updating a third parameter associated with the work item to indicate the work item is assigned to the user; and
presenting to a second user at least one message indicating the work items that are not assigned to users, which users are qualified to work on the work items that are not assigned to users, which users are overcommitted and which users are not fully utilized.

9. The system of claim 8, wherein presenting the filtered work item list comprises:
presenting the work items in the filtered work item list in an order based on respective levels of importance of the work items.

10. The system of claim 8, wherein filtering the work item list further is based on the first parameter and at least a third parameter associated with the user that corresponds to the first parameter, wherein the third parameter pertains to a desire of the user to work on work items beyond the level of skill assigned to the user.

11. The system of claim 10, wherein presenting the filtered work item list to the user comprises visually distinguishing in the filtered work item list the work items for which the level of skill of the user matches the first parameter from the work items beyond the level of skill assigned to the user.

12. The system of claim 8, the executable operations further comprising:
receiving at least a third parameter associated with the work item; and
associating the third parameter with the work item;
wherein filtering the work item list based on the first parameter and at least a second parameter associated with the user comprises filtering the work item based on the first parameter, the second parameter, the third parameter and at least a fourth parameter associated with the user that corresponds to the third parameter, wherein the third parameter pertains to an area of work in which the user specializes or has the requisite knowledge;
wherein the filtered work item list indicates work items for which the user has the requisite level of skill and pertain to the area of work in which the user specializes or has the requisite knowledge.

13. The system of claim 8, wherein the filtered work item list further indicates work items for which other users have requisite levels of skills.

14. The system of claim 8, wherein the filtered work item list further indicates which users are qualified to work on the work items that are not assigned to users.

15. A computer program product for presenting a list of work items to a user, the computer program product comprising a computer-readable storage medium having program code stored thereon, the program code executable by a processor to perform a method comprising:
for each of a plurality of the work items:
receiving, by the processor, at least a first parameter to be associated with the work item, the first parameter indicating a level of risk assigned to the work item; and
associating, by the processor, the first parameter with the work item;
compiling, by the processor, each of the plurality of work items in a work item list; and
in response to receiving a request to present the work item list to the user:
filtering, by the processor, the work item list based on the first parameter and at least a second parameter associated with the user that pertains to a level of skill of the user; and
presenting, by the processor, the filtered work item list to the user, wherein the filtered work item list indicates work items for which the user has a requisite level of skill, and indicates work items for which the user does not have the requisite skill level but are not assigned to users and are assigned a low level of risk;
receiving, by the processor, a user input selecting a work item to be assigned to the user;
responsive to receiving the user input selecting the work item to be assigned to the user, updating, by the processor, a third parameter associated with the work item to indicate the work item is assigned to the user; and presenting, by the processor, to a second user at least one message indicating the work items that are not assigned to users, which users are qualified to work on the work items that are not assigned to users, which users are overcommitted and which users are not fully utilized.

* * * * *